Figure 1:
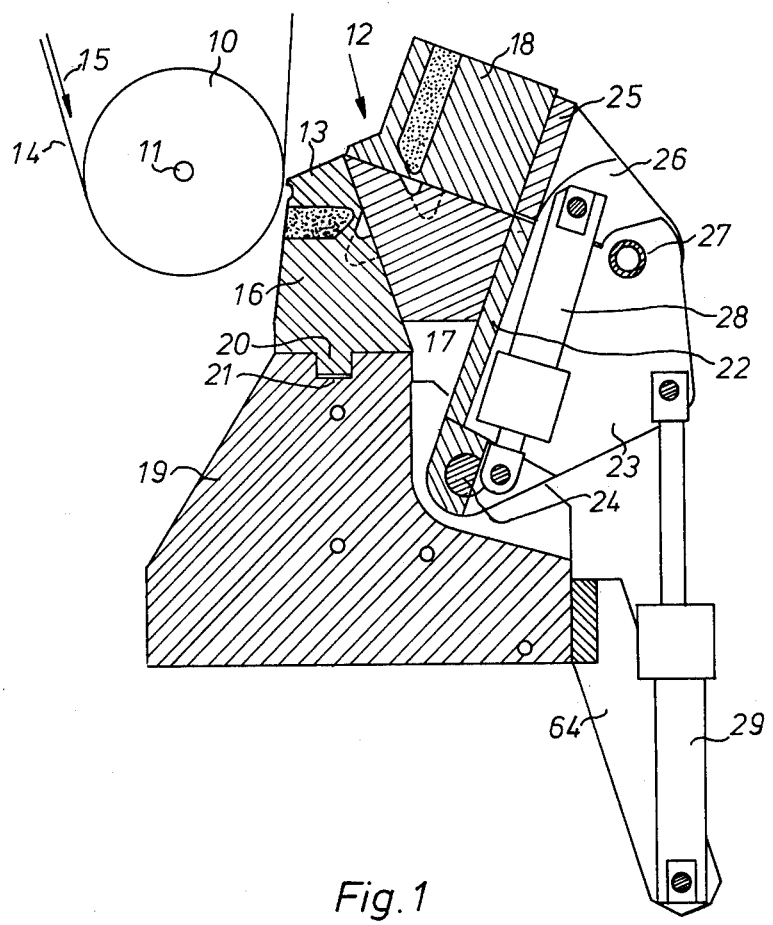

United States Patent [19]

Vermeylen et al.

[11] 4,032,284

[45] June 28, 1977

[54] DIE ASSEMBLY

[75] Inventors: René Leonard Vermeylen, Heist op den Berg; Jozef Jan Onghena, Heverlee, both of Belgium

[73] Assignee: AGFA-GEVAERT N.V., Mortsel, Belgium

[22] Filed: May 29, 1975

[21] Appl. No.: 581,916

[30] Foreign Application Priority Data

June 6, 1974    United Kingdom ............ 25216/74

[52] U.S. Cl. ................................ 425/466; 425/381
[51] Int. Cl.² .......................................... B29F 3/04
[58] Field of Search .......... 425/380, 381, 465, 466, 425/188, 192; 264/176 R

[56] References Cited

UNITED STATES PATENTS

| | | | |
|---|---|---|---|
| 3,067,464 | 12/1962 | Nicholson | 425/466 |
| 3,096,543 | 7/1963 | Konopacke et al. | 425/466 |
| 3,702,751 | 11/1972 | Mehnert | 425/466 X |

Primary Examiner—Richard B. Lazarus
Assistant Examiner—Mark Rosenbaum
Attorney, Agent, or Firm—William J. Daniel

[57] ABSTRACT

Adjustment mechanism for a lip of a die, comprising a row of rods that are fitted to said lip and springs that pull said rods in one direction, and rotatable adjustment shafts that have at their ends an eccentric shaft portion for engaging the free extremities of said rods thereby to displace said rods in a direction opposite to the direction of biasing by the springs.

6 Claims, 3 Drawing Figures

DIE ASSEMBLY

The present invention relates to a die having a slot-like orifice via which material can be extruded or forced out as a layer.

Dies with an elongate adjustable lip are known which comprise a die body member which comprises a main part and a smaller part, joined by a neck portion of relatively small cross-section. The main part serves as an undeformable base whereas the smaller part is capable of being deflected by means of a plurality of adjustment screws which are spaced lengthwise of the die and which connect a free end portion of said smaller part with the main part of the die body. The smaller part forms or has attached thereto, a lip which becomes deflected when the adjustment screws are turned to bend the neck portion of the die body. An important disadvantage of the described type of die is that the neck portion of the said die body member can easily be over-loaded. As a matter of fact, it has been shown that an incorrect adjustment of even a few adjustment screws by an unskilled operator ccan create stresses in the weakened or neck region which exceed the elastic limit of the die body material so that the neck region may become permanently deformed and it is necessary to replace the said die body member.

The present invention provides a die having an adjustment means such that adjustments can be more safely entrusted to unskilled operators.

According to the present invention, there is provided a die wherein there are two bodies defining a slot leading to a slot-like orifice defined by two lips formed or carried by said bodies, and wherein there is adjustment means whereby one of said bodies is adjustable relative to the other of them for varying the width of such slot, characterised in that the said adjustment means comprises a plurality of rods secured to one said body and disposed in mutually spaced relation in a row extending substantially parallel with such orifice, each of said rods being axially displaceable for exerting on said one body a force tending to vary the spacing of the associated lip from the other lip at a region along the length of such orifice, and, in engagement with each of such rods, a cam which is mounted for rotation in said one body and has an integral or attached shaft which is accessible for turning such cam and thereby adjusting the position of the associated rod.

Preferably each said rod is spring-biased into engagement with the associated cam.

The invention is primarily intended for embodiment in a die wherein said one body comprises a neck portion which is elastically deformable as hereinbefore referred to, such elastic deformation being brought about by forces transmitted via said rods, thereby to adjust the distance between the die lips.

A die according to the invention may be of a type having or associated with a slide surface along which material leaving the die flows from the device, e.g. onto a traveling support which becomes coated with such material.

The die bodies which form or carry the die lips are preferably separately fabricated bodies. However the invention does not exclude a construction wherein said bodies are integral parts of one mass of material joined by a deformable neck.

Dies are known which have two elongate or slot-like die orifices permitting the simultaneous formation of two layers which may become applied one on another before passing together onto a support. Such dies are, e.g., used in so-called cascade coaters for the application of liquid coating compositions onto a continuously moving web-like support. The body parts of such coaters are of heavy construction in the case that the coaters are designed for the extrusion of relatively wide layers, e.g., layers having a width greater than, say 1.00 m, since any bending of the coater results in a non-uniform distance between the extrusion slot or slots and the surface of the web being coated. It has, therefore, been proposed to use dies of a relatively light construction which are supported by a horizontal beam of rigid construction which forms part of the machine frame and which imparts the required stiffness to the die assembly. A disadvantage of such disposition is that the adjustable lower lip of the lower die orifice is masked by the supporting beam so that access to the adjustment screws of said lip is difficult or is possible only when the coater is inoperative and is withdrawn from operative position in relation to the web supporting roller.

In a die according to the invention, the adjusting mechanism can easily be arranged so that it is accessible for adjustment at positions remote from the die orifice or orifices and of any support for the die assembly.

Thus in a die according to the invention each said cam may have an integral or attached shaft which is mounted in said one body for rotation about an axis which is substantially normal to the axis of the associated rod.

Preferably each of said integral or attached shaft extends from its said cam in a direction towards the plane of the slot. It is particularly advantageous for said shaft to project from said one body so that an end portion of such shaft is exposed within the projected area of a face of the other of said bodies.

The invention includes any die assembly having the following features : at least two spaced lips that define at least one elongate die orifice, at least one of said lips being arranged for limited displacement towards and away from the opposite lip, and a plurality of adjusting means that are spaced along the length of said one lip for the adjustment of said lip, and characterised in that each such adjusting means comprises an adjusting rod that is fitted by one end thereof to said displaceable lip, spring means for biasing said adjusting rod axially in one direction, and a rotatable shaft which extends normally or nearly normally to said adjusting rod and that is provided with an eccentric portion arranged for co-operation with said adjusting rod, to control the axial position of said rod upon rotation of said shaft.

The eccentric portion thus forms the rotatable cam mentioned hereinbefore.

Other preferred but optional features of the invention are as follows.

The eccentric portion of each shaft has a circular cross-section and co-operates with a separate member that is fitted to the free end of the corresponding adjusting rod.

Said separate member is a saddle-shaped member that is rotatably fitted to said rod.

Finally, each adjusting rod is in screw-threaded engagement with the lip and is arranged for engagement by an appropriate tool for rotation, thereby to adjust the axial position of the rod with respect to the lip.

A die assembly according to the present invention may be used for application of liquid compositions onto a moving weblike support according to the so-called cascade coating process which comprises flowing a layer of liquid coating composition over a slide surface, and forming a bead of coating composition between the end of the slide surface and the surface of the web to be coated, and the description hereinafter will particularly refer to die assemblies for cascade coating. It should be understood, however, that a die according to the invention may for example be used in an installation for the coating of layers onto a support according to the so-called extrusion or curtain coating techniques wherein the formation of a layer of a liquid coating composition occurs likewise by pumping coating composition from a supply thereof through an elongate opening which is formed by two lips, or by two members capable of determining opposite inner lip surfaces.

A die assembly according to the invention can also be used for forming films or self-supporting layers. An example of such formation of films is the extrusion of a molten thermoplastic, for instance polyethylene terephthalate in the production of film base for photographic material or magnetic recording material. An example of a self-supporting layer is the coating of a magnetizable layer onto a polished temporary support such as an endless belt. The layer is stripped off the support after solidification and adhered to a permanent support so that a magnetic recording material may be obtained with an extremely smooth recording surface.

Figure 2:
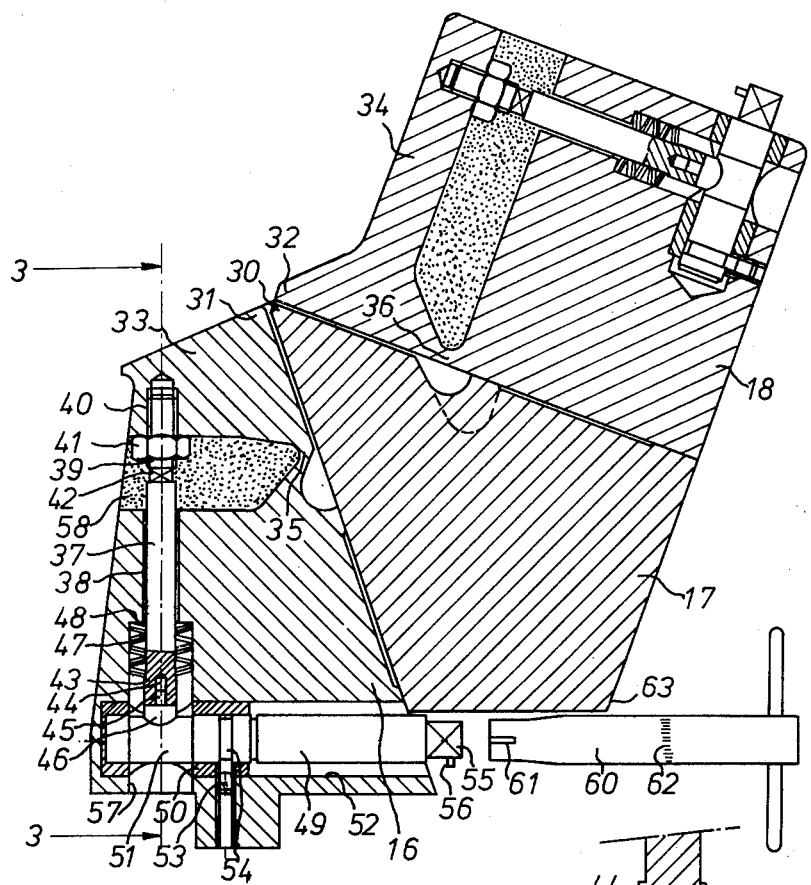
Figure 3:
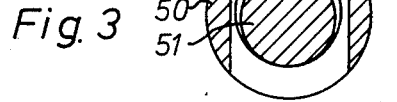

The invention will hereinafter be described by way of example with reference to the accompanying drawings wherein:

FIG. 1 is a diagrammatic vertical sectional view of a cascade coater for the simultaneous coating of two layers, FIG. 2 is an enlarged vertical sectional view of the die assembly of the coater according to FIG. 1, FIG. 3 is a partial sectional view on line 3—3 of FIG. 2.

Referring to FIG. 1, the cascade coater illustrated comprises a web supporting roller 10 which is mounted for rotation on a shaft 11, and a die assembly 12 for the formation of two coating layers which simultaneously flow in superimposed relationship over a slide surface 13 that ends at a distance of some tenths of a millimeter from the surface of a paper or film support 14 which is pulled over the roller 10 in the direction indicated by the arrow 15. The coating compositions form a bead between the lower end of the slide surface 13 and the outer side-surface of the support 14 so that the advancing support may pick up two combined layers from said bead. As known in the art, the coating bead may be stabilised by means (not shown) which creates a force which tends to displace the coating bead towards the lower side, for instance by maintaining at the upper side of the bead atmospheric pressure and by establishing at the lower beadside a reduced pressure.

The die assembly 12 comprises the body members 16, 17 and 18 and is supported on a rigid machine beam 19 of solid construction. The fixation of the die assembly to the beam occurs by means of a plurality of bolts (not shown) which extend upwardly through vertical bores in the beam 19, and which threadedly engage corresponding bores in lower part of the body member 16. The exact positioning of the die assembly on the beam occurs by means of an elongate tongue 20 of the body member 16 which fits in a corresponding groove 21 in the beam 19. The die body member 17 may be fitted in a known way to the member 16 by means of a plurality of bolts passing through said member 17 from the rear side thereof, whereas the die body member 18 may be fitted in a similar way to the member 17. In order to facilitate the cleaning and maintenance of the die assembly, the die body members 17 and 18 are mounted for pivotal movement so that they may be swung away after the fixation bolts have been removed. Thus the body member 17 is fitted at both its extremities to support plates such as the support 22 shown having a wing 23 through which passes at the lower end a shaft 24 which is rotatably journalled in the beam 19, whereas the body member 18 is provided at its lateral ends with support plates such as the support 25 shown having a wing 26 through which passes a shaft 27 which is journalled at the upper end of the wings 23 of the support 22.

In order to open the die assembly, a first pneumatic or hydraulic motor 28 may be provided which is connected to a wing 26 belonging to the body member 18 and to a corresponding wing 23 belonging to the body member 17, and a second motor 29 which is connected to a wing 23 belonging to the body member 17 and to an arm 64 which is fitted to the supporting beam 19. The motors are so actuated that motor 28 extends and motor 29 retracts whereby the body members 17 and 18 are swung away from each other and also away from the stationary body member 16.

The coater may further be provided with heating means known as such for establishing the correct operation temperature of the die assembly. Such heating means may be in the form of bores in the die body member, or of pipes located in corresponding grooves in the die body members, so that a heating or cooling liquid may be circulated through such bores or pipes.

Referring to FIG. 2, it may be seen that the die assembly of the coater comprises one fixed lip 30 and two adjustable lips 31 and 32. The fixed lip 30 is formed by the appropriately shaped end of the body member 17, whereas the lips 31 and 32 are formed by corner edge portions of parts 33 and 34 which are in fact smaller parts of the die body members 16 and 18 and which are joined to the main parts of such members via the regions of locally reduced cross-section (neck portions) 35 and 36.

The adjustment mechanism according to the invention will now be described with reference to the die body member 16 wherein a plurality of adjusting rods, such as the cylindrical rod 37 shown, are provided which are spaced lengthwise of the die assembly and the axes of which are located in one plane. Each rod 37 extends through a bore 38 in the die body member 16 with a diameter which is sufficiently wide so as to tolerate a slight swinging movement of the rod as a consequence of the lateral displacement of the lower end of the rod which is engaged by an eccentric which will be described hereinafter. The upper end 39 of the rod 37 is threaded and is partly screwed in a threaded bore 40 in the die section 33.

A locking nut 41 serves for locking the position of the rod. The rod 37 is further provided with a portion 42 which is arranged for engagement by a tool such as an open end wrench ; in the present embodiment the section 42 has a square cross-section. The lower end of the adjusting rod 37 has a portion 43 of slightly increased diameter which is provided with an axial bore 44, see also FIG. 3, wherein the pin 45 of a saddle-shaped member 46 with circular cross-section fits for free rotation. A plurality of compression springs, such as the disc springs 47 shown, are provided between the portion 43 of the rod and a shoulder 48 which is formed in the body member 16 by a widened portion 57 of the bore 38.

The adjustment of the axial position of the adjusting rod 37 occurs by means of a shaft 49 which is rotatably journalled in a bushing 50 and which has a circular eccentric portion 51 which co-operates with the concavely curved lower surface of the saddle-shaped member 46. The bushing may be secured in the bore 52 of the body member 16 by glueing and by means of a set screw 53. The non-threaded extremity of the set screw may engage a circular groove 54 in the shaft 49 for determining the axial position of the shaft. The free extremity of the shaft is provided with a head piece 55, in the present case a square head piece, for engagement by an adjustment tool. A pin 56 on one face of the head piece may provide an indication of the angular position of the shaft.

The bushing 50 has a transverse bore in register with the widened bore 57 so that at any time the adjusting rod with the compression springs may be removed after removal of the shaft The primary adjustment of the die lips may occur as follows. The adjusting rods 37 and the shafts 49 being not yet mounted in the die assembly and the die body member 16 being mounted on a suitable caliber on a work bench, blocks or wedges are inserted in the space 58 so that the region 35 or relatively weak cross-section undergoes no notional stress.

The adjusting rods provided with the corresponding compression springs are introduced into the bore 38 via its widened portion 57, the nuts 41 are screwed on the threaded extremities of the rods and the rods are then screwed in section 33 over a distance which is slightly in excess of the normal distance, so that the saddle-shaped member 46 of the rods do not obstruct the inertion of shafts 49 into the bushings 50. These shafts are then put in place and secured in predetermined axial positions by the set-screws 53. Therefater the rods 37 are unscrewed from section 33 over a distance such that the saddle-shaped members just firmly contact the eccentric portions 51 of the shafts 49, these shafts having previously been set in neutral position, that is a position such as to support the adjusting rods halfway between their upper and lower limits of adjustment.

The nuts 41 are then locked whereupon the clamping blocks may be removed from the space 58. Said space may be filled with a suitable compound, for instance silicone rubber, which does not impede adjustment of the lip but which seals the mechanism against any coating compositions which may spill over the front side of die body member 16.

The described adjustment or pre-setting is a basic operation whereby the neutral position of the shafts 49 is made to correspond with the theoretically correct position of the lip 31 for determining a die orifice with the required width and uniformity. It will be understood, however, that as a consequence of non-perfect machining of the lip surfaces and of stresses occurring in the die body members during mounting and operation thereof, the lip position will require local corrections in order to obtain a perfect die orifice.

Such corrections may be easily carried out during the operation of the coating apparatus, since the heads 55 of the adjusting shafts 49 are well remote from the die orifice and the backing roller, and of the beam 19 which supports the die assembly. In the present case, the shafts 49 were rotated by means of a pipelike wrench 60 which is shown in FIG. 2 in a position slightly separated from the bead 55 and angularly displaced through 90 degrees with respect to such head in order to show the slotlike opening 61 which co-operates with the pin 56 to locate the wrench in a predetermined position on the head. The shank of the wrench may be provided with graduations 62 for co-operating with marks on the rear surface 63 of the body member 17, so that an accurate and reproducible adjustment of the individual adjusting rods is possible. The following example illustrates the described embodiment of the invention.

Length of the die orifice—1100 mm
Width of a die orifice—0.28 mm
Number of adjusting rods—14
Biasing force of adjusting rod by springs 47—150 kp
Eccentricity of the portion 51 of a shaft 49—0.03 mm
Adjustment range of a lip edge—0.06 mm The adjustment of the die orifice which is determined by the lips 30 and 32 may occur in a way which is similar to that described hereinbefore and illustrated in FIG. 2, but if desired this adjustment may also occur by means of a conventional mechanism since the accessibility of this upper lip presents no problems. It should be noted, however, that the problem of overstress of the weakened region 36 of the upper body member 18 is the same as for the lower body member 16, and for this reason it is preferred to use a mechanism according to the invention for the adjustment of the upper lip since the adjustment range of the lip is then determined by the orientation of the eccentric portion of the adjustment shaft and not by the number of revolutions of the adjustment shaft so that an unskilled or inattentive operator cannot harm the die assembly.

The present invention is not limited to the described embodiment. The invention also includes cascade coaters having either one single or more than two die orifices. In the latter case not all of the die orifices may be adjustable. An adjustment mechanism according to the invention may also be used for the adjustment of both lips of an elongated die orifice, and an application of such technique may be found, for instance, in the adjustment of the lip of a single layer extrusion coater.

The lips of the die assembly may have grooves at their lateral extremities thereby to produce a layer with beaded edges, as for instance in the case of the extrusion of a thermoplastic orientable polymer film which is oriented after extrusion by longitudinal and lateral stretching to improve the physical properties by molecular orientation. The lateral stretching of such film occurs by clamps that grip the film edges and that follow diverging paths, and it has been shown that film edges which are beaded may be more firmly held by such clamps than non-beaded edges. An other aspect related to the lateral strecthing of polymer film is that the lateral stretching of the film may be non-uniform across the width of the film, thus leading to a film with a thickness which is non-uniform over its width, in such a case the adjustment of the die orifice may be deliberately adjusted to a condition which gives an extruded film with a thickness disuniformity which compensates for the non-uniform variations of the film thickness that will occur upon lateral stretching.

We claim:

1. In an extrusion die assembly comprising two bodies defining a slot terminating in an elongated slot-like orifice and defined by two lips carried by said bodies, adjustment means operatively associated with one of said bodies for adjusting the position of said one body relative to the other for varying the width of such slot, the improvement wherein said adjustment means comprises a plurality of rods each having one extremity in threadwise engagement with said one body and disposed in mutually spaced relation in a row extending substantially parallel with the length of said orifices, each of said rods being axially displaceable for exerting on said one body a force tending to move such body relative to the other body to vary the orifice width, each of said rods being mounted for rotation and including exteriorly accessible means for rotating the same to adjust the initial axial position of said rod and thus the initial width of said slot, and, for each such axially displaceable rod, a rotatable rod arranged with its axis intersecting the axis of said displaceable rod, said rotatable rod having a portion of its peripheral wall extending eccentrically of the rod axis with said eccentric wall portion in abutment with the free end of the corresponding displaceable rod and means on an axially spaced portion of each rotatable rod which is accessible exteriorly of the assembly for rotating the same and thereby controllably displace said displaceable rod by engagement with said eccentric wall portion, each said displaceable rod having at its free end a separate extension connected to the remainder of the rod for independent rotation, the end face of said extension being arcuately shaped for engagement over substantially the entirely of said face with said eccentric wall portion.

2. A die according to claim 1, wherein the lip carried by said one body is carried by a first body portion which is joined to a second body portion via a neck portion which is elastically deformable under forces exerted via said displaceable rods.

3. A die according to claim 2, wherein displaceable rods are secured to said first body portion and are mounted for axial and rotation displacement in bores in said second body portion.

4. A die assembly according to claim 1, wherein each said rod is provided with a nut for locking its axial position.

5. A die according to claim 1, wherein each said axially displaceable rod is spring-biased into abutting engagement with said eccentric wall portion on the associated rotatable rod.

6. A die according to claim 1, wherein the axis of each rotatable rod intersects the axis of the associated axially displaceable rod at an angle of 90°.

* * * * *

UNITED STATES PATENT AND TRADEMARK OFFICE
CERTIFICATE OF CORRECTION

PATENT NO. : 4,032,284
DATED : June 28, 1977
INVENTOR(S) : Rene Leonard Vermeylen et al It is certified that error appears in the above-identified patent and that said Letters Patent are hereby corrected as shown below:

In the Claims:

Column 8, line 6, "entirely" should read -- entirety --.

line 15, "and rotation displacement" should read -- displacement and rotation --.

Signed and Sealed this

Twentieth Day of September 1977

[SEAL]

Attest:

RUTH C. MASON
Attesting Officer

LUTRELLE F. PARKER
Acting Commissioner of Patents and Trademarks